Figure 1:
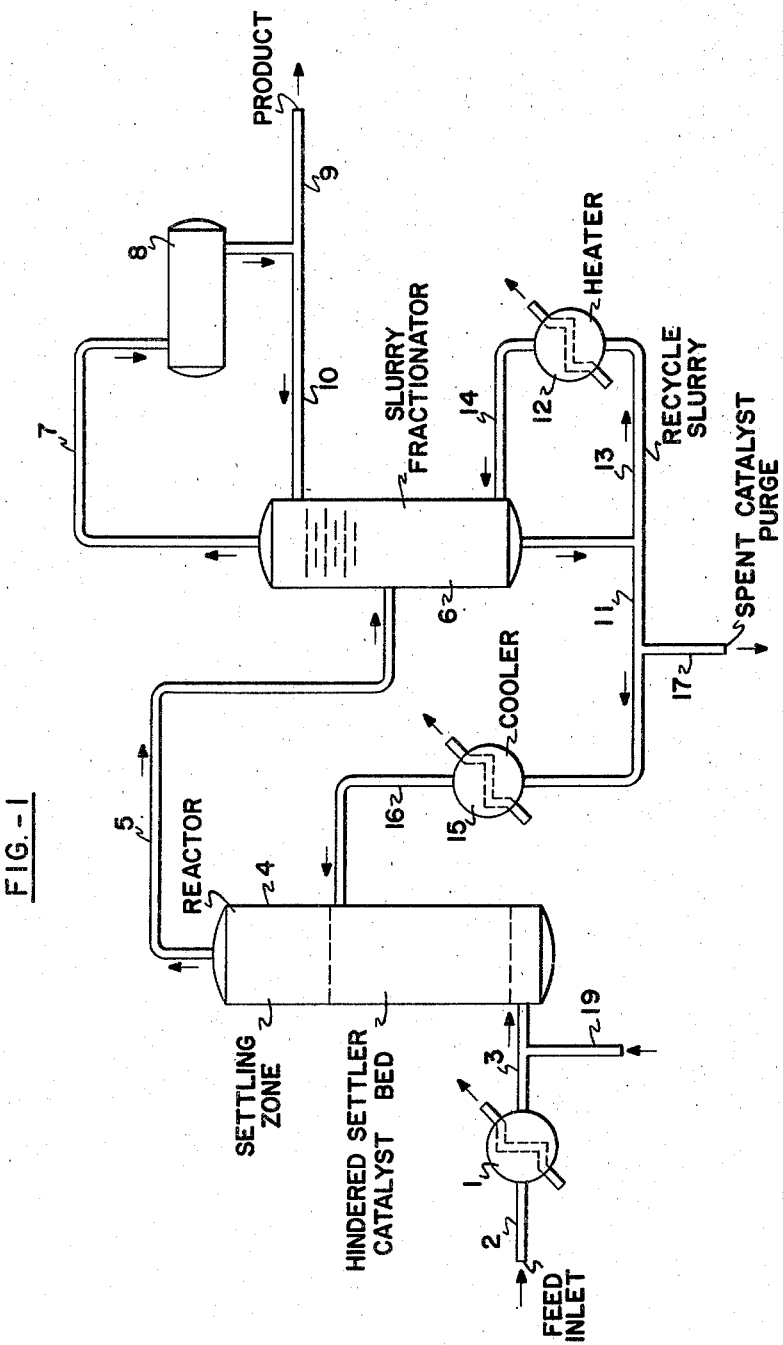

Feb. 18, 1958 E. S. CORNER ET AL 2,824,149
OLEFIN POLYMERIZATION CATALYST AND PROCESS
Original Filed July 16, 1951 3 Sheets-Sheet 3

Eugene S. Corner
Charles S. Lynch   Inventors

By Richard J.J. Nagel Attorney

United States Patent Office 2,824,149
Patented Feb. 18, 1958

2,824,149

OLEFIN POLYMERIZATION CATALYST AND PROCESS

Eugene S. Corner, Maplewood, and Charles S. Lynch, Plainfield, N. J., assignors to Esso Research and Engineering Company, a corporation of Delaware Original application July 31, 1951, Serial No. 239,524, now Patent No. 2,778,804, dated January 22, 1957. Divided and this application December 8, 1953, Serial No. 396,842

7 Claims. (Cl. 260—683.15)

The present invention is concerned with the polymerization of olefins. The invention is more particularly concerned with an improved polymerization catalyst and process for using the same whereby unexpected and desirable results are obtained. This application is a continuation-in-part of application, Serial No. 96,126, filed May 28, 1949, now abandoned, and a division of copending application, Serial No. 239,524, filed on July 31, 1951, now U. S. Patent No. 2,778,804.

One method for carrying out the polymerization of olefins is that in which a finely divided, solid phosphoric acid catalyst such as kieselguhr and silica gel-base catalysts is maintained as a suspension or slurry in a hydrocarbon phase. In one modification, the suspension is maintained at extremely high pressure conditions, and olefins are brought into contact with a dense catalyst phase under conditions such that high yields of polymers are obtained. In this operation, the catalyst is easy to handle, readily removed from the unit and replaced by fresh catalyst, and heat balance within the reaction zone is easily maintained. However, many of the solid phosphoric acid catalysts tend to agglomerate during the polymerization step resulting in loss of activity. Furthermore, agglomerated catalyst is almost impossible to maintain in suspension. The agglomerating tendency has been overcome or minimized by employing with the catalyst various types of finely divided, solid adsorbents such as silica gel, activated carbon, and the like which act as solid diluents. Special stirring techniques have been used also for minimizing agglomeration. Each of these methods present certain problems that make its use undesirable in certain types of operations.

It has now been discovered that a silica gel-base phosphoric acid catalyst prepared in a special manner is eminently suitable for use in suspension type processes wherein the catalyst is maintained as a slurry or as a fluidized dense phase in hydrocarbons. The catalyst of the present invention is made by forming an intimate mixture of a hydrogel comprising silica and a phosphoric acid, and heat treating the mixture to dehydrate and activate it. This catalyst exhibits no tendency to agglomerate and also has a much higher polymerization activity than similar catalysts made by impregnating substantially dry silica gel with phosphoric acid. The catalyst has a low mechanical strength which makes it unsuitable for use in conventional fixed bed polymerization operations because of excessive disintegration. On the other hand, this properly makes the catalyst particularly suitable for suspension-type operations since it has the ability of maintaining a high activity for long periods of time due to gradual disintegration.

Figure 2:
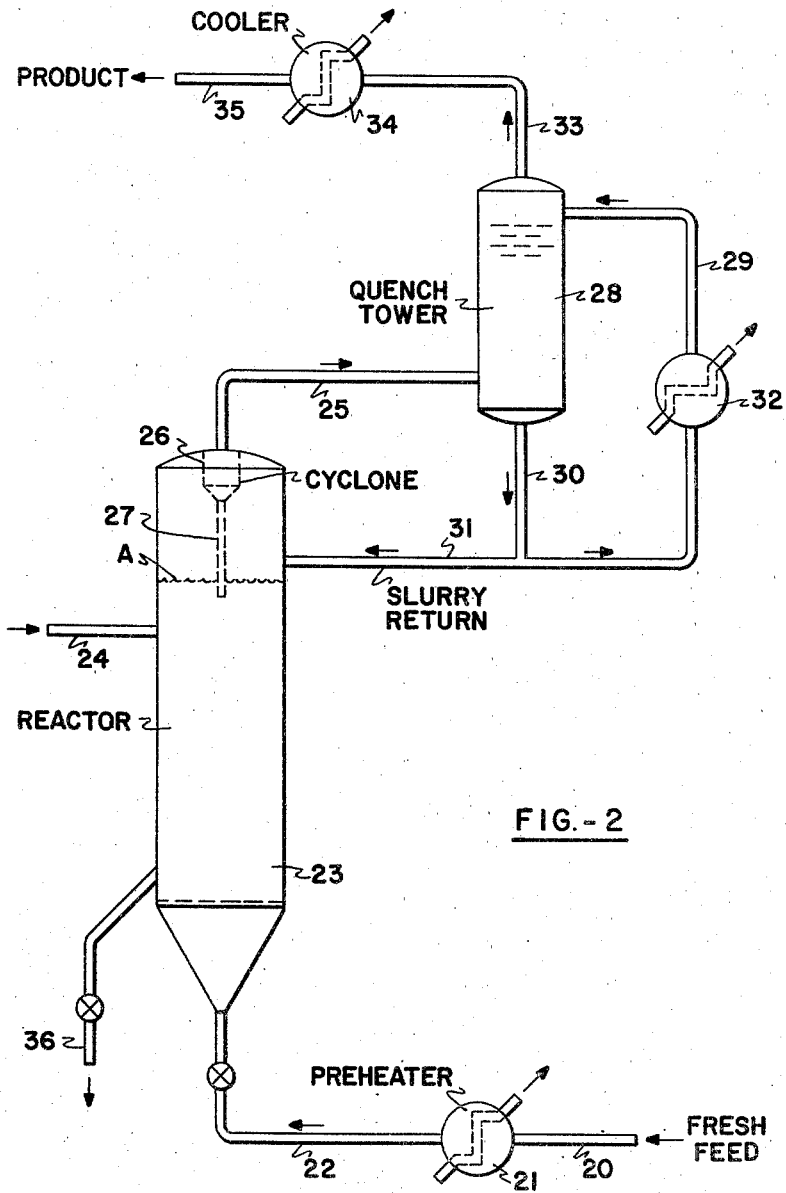
Figure 3:
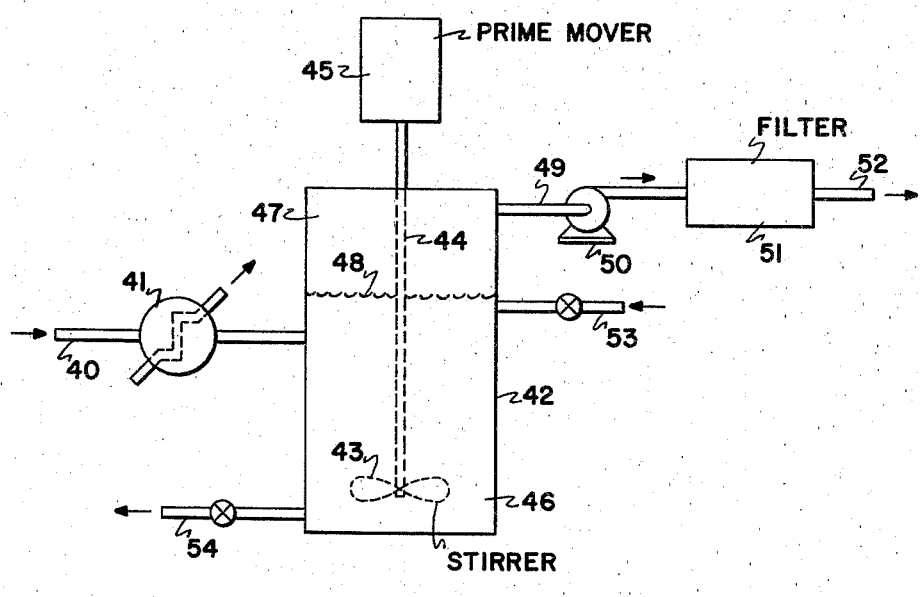

The process of the present invention may be more readily understood by reference to the attached drawings illustrating embodiments of the same. Figure 1 illustrates a hindered settler slurry type polymerization operation and Figure 2 illustrates a fluidized catalytic polymerization process. Figure 3 shows a mechanically stirred reaction zone.

Referring specifically to Figure 1, a feed stream, which for the purpose of illustration is assumed to be a liquefied normally gaseous hydrocarbon stream containing olefins, is passed through heating zone 1 by means of line 2. In this zone, the feed stream is heated to the desired temperature and withdrawn by means of line 3. The heated stream, which is at a temperature below the reaction temperature, is introduced into the bottom of raction chamber 4. Operations are so conducted as to provide a hindered settler catalyst bed suspended in highly dense hydrocarbons in the lower area of reactor 4. The catalyst bed comprises phosphoric acid deposited on silica gel prepared in accordance with the present invention. The upper area of reactor 4 comprises a settling zone wherein the catalyst particles tend to settle from the hydrocarbon flowing upwardly in zone 4. For the purpose of illustration, it is assumed that the pressure in reaction zone 4 is about 1000 lbs. per square inch. Hydrocarbon fluid linear velocities in the range of about 1 to 10 feet per minute are usually required in the hindered settler bed to keep the catalyst slurried at high pressures.

The product stream is withdrawn from the top of reactor 4 by means of line 5 which stream contains catalyst fines. This stream is introduced into a slurry fractionation zone 6 which is maintained at a pressure preferably in the range from about 50 lbs. to 200 lbs. per square inch. A product stream completely free of catalyst fines is removed overhead from zone 6 by means of line 7 and passed into accumulation zone 8. A polymerized product comprising hydrocarbon constituents boiling in the motor fuel boiling range is withdrawn from zone 8 by means of line 9 and is further refined or handled as desired. Under certain conditions it may be desirable to recycle a portion of the product stream into zone 6 by means of line 10. The desired temperature in zone 6, which may vary from about 70° F. to 150° F. and higher, is maintained by any suitable means, as, for example, by a reboiler arrangement. A recycle slurry stream is withdrawn from the bottom of zone 6 by means of line 11. A portion of this stream is passed through heater 12 by means of line 13 and recycled into zone 6 by means of line 14. The recycle stream removed from zone 6 is passed through a cooling zone 15 and reintroduced into zone 4 at an intermediate point by means of line 16. Periodically fresh catalyst is added to zone 4 by any suitable means while spent catalyst is withdrawn from the system by means of purge line 17. Water may be introduced into the system by means of line 19.

Referring specifically to Figure 2, a feed stream, which comprises normally gaseous hydrocarbons containing $C_3$–$C_4$ olefins is introduced into the system by means of line 20 and passed through a preheater zone 21. These gases which are in the temperature range from about 250° F. to 300° F., are withdrawn from zone 21 by means of line 22 and introduced into the bottom of a reaction zone 23, wherein a catalyst is maintained in the fluidized state. Reaction zone 23 is preferably maintained at a pressure of about 300 lbs. per square inch and at a temperature of about 500° F. The catalyst comprises phosphoric acid on silica gel prepared in accordance with the present invention. The catalyst particles have diameters in the range from about 20 to about 180 to 300 microns, and preferably have diameters in the range from about 20 to 120 microns. The linear velocity of the upflowing gas is in the range from about 0.5 to 10 feet per second, whereby the catalyst particles are maintained in a fluidized state. The upper section of the fluidized catalyst bed is maintained at point A in the reaction zone.

During the operation, water is added continually or periodically to a point in the catalyst bed by means of line 24. The reaction product is removed from the top of zone 23 by means of line 25 after passing through cyclones or equivalent means 26. These cyclones serve to remove catalyst particles in the gas which are returned to the catalyst bed by means of line 27. The reaction gases are introduced into the bottom of a quench tower 28. These gases flow upwardly and countercurrently contact a downflowing quench liquid which is introduced into the top of zone 28 by means of line 29. The quench liquid serves to cool the reaction gases thus preventing any further reaction and to remove the last traces of catalyst particles from the gases. The slurry is removed from the bottom of zone 28 by means of line 30. A portion of the slurry is returned to zone 23 by means of line 31 at a point above the catalyst bed. The remainder of the slurry is passed through cooler 32 and recycled to the top of quench tower 28.

The product gases comprising hydrocarbons boiling in the motor fuel boiling range are removed overhead from zone 28 by means of line 33, passed through cooler 34 and removed from the system by means of line 35. These gases are condensed and further refined and handled as desired. Spent catalyst is removed from the system by withdrawing the same from the bottom of zone 23 by means of line 36.

Referring to Figure 3, an olefin-containing feed is charged through line 40 containing heat exchanger 41 into reaction zone 42. Stirring means 43, affixed to shaft 44, which in turn is rotated by any suitable prime mover 45, is disposed in the lower portion of zone 42. A finely divided catalyst prepared in accordance with the present invention is maintained as a dense suspension in the hydrocarbon fluid contents of zone 42 by rotating the stirrer 43 at high speed. The dense catalyst phase 46 is separated from disperse catalyst phase 47 by interface 48.

Zone 42 is preferably maintained at a pressure of about 1000 p. s. i. g. and at a temperature of about 450° F. $C_4$ olefins are preferably charged into dense phase 46 at a rate of about 1.0 gallon of feed per hour per pound of catalyst.

Hydrocarbon effluent containing the product polymer is withdrawn from disperse phase 47 by means of line 49 and is pumped through pump 50 to a suitable catalyst separation device such as filter 51. The catalyst derived from silica hydrogel has a relatively low mechanical strength and tends to disintegrate, particularly when using rather violent agitation of the catalyst. Consequently, catalyst fines will be formed that will tend to entrain through disperse phase 47 with the effluent. Such fines may be removed by filtration, by distillation of the effluent to remove a heavy slurry of the catalyst, by settling, or by disposing baffle means in the upper portion of zone 42 whereby catalyst fines settle back into the disperse phase. Other means of forming an effluent substantially free of catalyst will be obvious to those skilled in the art. A substantially catalyst-free effluent is then passed by means of line 52 to a suitable recovery means not shown.

Fresh catalyst suspended in a suitable fluid carrying medium, such as polymers produced in the recovery system, or catalyst removed from the effluent during the separation step, may be charged into the upper portion of dense phase 46 through line 53. Spent catalyst may be withdrawn intermittently, or continuously, from dense phase 46 through line 54.

The catalyst of the present invention is prepared by forming a mixture of a silica-containing hydrogel and phosphoric acid. The intimate mixture of these materials may be formed either by adding a phosphoric acid to a silica hydrosol and then allowing gel formation to occur or by preforming a silica hydrogel and then mixing with the acid.

For example, a silica hydrosol may be obtained by percolation of sodium silicate through an acid-regenerated cation exchange resin to remove contaminating materials by procedures well known to the art. The resulting purified silica hydrosol, which may contain up to about 98% by weight of water, is then admixed with sufficient phosphoric acid to form the desired concentration of acid in the finished catalyst and, if desired, it may be further admixed with a metal salt promoter. This mixture forms a clear, homogeneous mobile liquid which is allowed to set into a hydrogel. The gel may then be broken up into lumps, and heat treated by the procedure hereinafter described to form an active catalyst.

In another procedure, a hydrocarbon silicate, such as alkyl silicate, particularly ethyl ortho-silicate, is admixed with a desired amount of phosphoric acid solution whereby the silicate is hydrolyzed and gel formation occurs prior to the heat treating step. This procedure is particularly advantageous from the standpoint that harmful metallic ionic contaminants are not formed during the hydrolysis step, and expensive purification procedures are not required.

In a preferred procedure, the silica hydrogen is formed before admixing with phosphoric acid. One method of preparing the hydrogel comprises adding a mineral acid such as sulfuric or hydrochloric acid to an alkali metal silicate under conditions such that a hydrogel is formed. After gelation, the silica hydrogel is washed substantially free of contaminating ions by procedures well known to the art and is dried and broken up into lumps before mixing with phosphoric acid. This gel preferably contains from 50 to 90 weight percent water depending on preparation variables used and the extent to which syneresis has occurred on standing before it is used in preparing the catalyst. The silica hydrogel may also be formed by allowing a silica hydrosol to set into a gel. If desired, an alkyl silicate, such as methyl-, ethyl-, propyl- and the like silicates may be hydrolyzed by the addition of water or a mineral acid and allowed to set into a silica hydrogel.

Lumps of the silica hydrogel may be then added to phosphoric acid, preferably as an aqueous solution, and an intimate mixture is formed by pulverizing the components together in a ball mill or by other suitable mixing means.

Other equivalent procedures may be used for forming the hydrogel-containing mixture comprising silica and phosphoric acid. The amount of water present in the mixture before heat treating may vary rather widely, depending on preparation variables. It will be understood that the mixture, before heat treating, may include water, present in the hydrogel and in the free state. It may also include silicon phosphate, silica, phosphoric acid or other materials that may be formed by reaction of the components. The term "mixture of silica-containing hydrogel and phosphoric acid" as used herein refers to materials which may contain some proportions of the above components.

Any acid of phosphorus may be used, as, for example, orthophosphoric acid, pyrophosphoric acid, diphosphoric acid, monoperphosphoric acid and diperphosphoric acid. In general, the preferred acids comprise orthophosphoric acid and pyrophosphoric acid. A metal compound promoter may be used and may include the phosphate, the nitrate, the sulphate, the chloride, the fluoride, and/or the oxide of copper and/or of nickel, for example. However, the preferred salt comprises nickel and copper phosphate.

The metal phosphate may be prepared by various methods, one of which is the addition of an aqueous solution of diammonium hydrogen phosphate to a solution of a suitable nickel or copper salt. The salt(s) may be the nitrate or sulphate, or the like. The precipitated metal phosphate is filtered and washed free of ionic contaminants or soluble salts. The metal phosphate may also be prepared by the addition of metal sulphate and sodium phosphate solutions. In general, any soluble metal compound may be combined with any soluble phosphate compound wherein the metal phosphate is the only compound which precipitates. It is within the scope of the present invention to avoid the separate preparation of nickel or copper phosphate by adding a nickel oxide or copper oxide, for example, to the hydrogel mixture, the oxide reacting with phosphoric acid to form the nickel or copper phosphate promoter.

The amount of phosphoric acid employed in preparing the catalyst may be varied appreciably. It is generally preferred that the concentration of phosphoric acid be equivalent to about 50 to 90% by weight of the heat-treated catalyst, preferably in the range from about 70 to 80 weight percent calculated as phosphoric acid. It will be understood that at least a portion of the phosphoric acid will probably be present as silicon phosphate. The amount of metal salt promoter may vary appreciably, such as in the range from about 0.1 to 15% by weight, preferably from about 1 to 5 weight percent, based upon the total catalyst.

The intimate hydrogel mixture comprising silica, phosphoric acid and, if desired, a metal promoter is preferably heat treated in at least two steps, the first being a drying step and the second a calcining step. The drying step is carried out at a temperature in the range of about 350° to 450° F., preferably 375° to 405° F., for a period of time sufficient to form a dry catalyst. If desired, the mixture may be dried in two stages. An initial drying stage at a temperature in the range of about 225° F. to 275° F. for a period of 2 to 5 hours is used. The mixture is then finally dried at a temperature in the range from 375° to 425° F. for a period of from about 10 to 20 hours until thoroughly dried.

The calcining operation is preferably carried out at a temperature above about 500° F. and usually no higher than 900° F. for a time sufficient to form an active polymerization catalyst, such as in the range of about 1 to 6 hours depending upon the calcination temperature utilized. Calcination temperatures as low as 450° F. may be satisfactory if continued long enough although preferably the calcination temperature is above 600° F. The calcined catalyst may then be ground to the desired particle size for the slurry or fluid operation. The term "finely divided catalyst" as used in the present specification and claims will generally refer to catalyst having particle sizes in the range of about 20 to 200 mesh (about 300 to 70 microns). It will be understood, however, that smaller particles will be formed during the suspension process due to attrition and other factors.

In general, feed streams comprise normally gaseous olefins such as ethylene, propylene, butylenes, pentylenes and mixtures thereof. These olefins are generally polymerized to dimers and trimers boiling below about 420° F. Although 100% olefinic streams may be used, preferred feed streams comprise from about 30 to 60% of olefins. Feed rates may vary widely depending on operating conditions, but they are usually in the range of about 0.5 to 15 volumes of liquid feed per volume of catalyst per hour (v./v./hr.).

Although the polymerization temperature may be in the range from about 300° F. to 900° F., a preferred polymerization temperature is in the range from about 350° to 600° F. A more specific preferred range is from about 450° to 500° F. as previously noted. Polymerization pressures likewise may vary widely, as, for example, in the range from atmospheric pressure up to 1500 p. s. i. g. or higher. Pressure in the neighborhood of 1000 p. s. i. g. is presently preferred. The catalyst may be suspended in a vaporous hydrocarbon phase in low pressure fluidized operations with pressures in the range from about atmospheric to 300 p. s. i. g. or higher. Pressures and temperatures may be adjusted such that a single liquid hydrocarbon phase exists in the reaction zone or both a liquid and a vapor phase coexist, the catalyst being slurried in the liquid phase. A particularly desirable operation is to maintain the hydrocarbons in a single fluid phase at above critical pressures, which requires pressures above about 900 p. s. i. g., and to keep the catalyst suspended therein. The catalyst may be maintained in agitated suspension in the fluid hydrocarbon by mechanical agitation, by upflow of feed through the reaction zone, by jetting the feed at high velocity through the suspension, or by other means.

In order to maintain the activity of the catalyst at high levels for long operating periods, it is usually necessary to inject continuously or at frequent intervals into the reactor containing the catalyst, small amounts of water in order to prevent dehydration of the catalyst. This water may be added in one of several ways. It may, if desired, be pumped directly into the inlet of the catalyst bed or metered streams may be employed. Another alternative is to contact the liquefied feed with water maintained at a suitable temperature to saturate the feed with the desired quantity of water. If the latter method is employed, the water for feed saturation is held at a temperature of from about 90° F. to 180° F. depending on operating conditions. An amount of water equivalent to from 0.1 to 2 gallons of water per thousand gallons of feed is usually required.

It is not understood why the surprising and unexpected results are obtained with the catalyst of the present invention. However, the catalyst composition prepared by this novel procedure has entirely different characteristics as compared to catalysts comprising substantially the same components prepared by conventional procedures. Although it is not intended to limit the scope of the invention by any theory, it appears that the use of wet silica hydrogel in the preparation produces a finished catalyst having unique structure, surface, strength, and chemical composition characteristics that make it particularly suitable for suspension-type polymerization operations.

The invention will be illustrated by the following examples:

EXAMPLE I

Catalyst A was prepared by adding sodium silicate to sulfuric acid to form a silica hydrogel containing about 80% water. The gel was washed free of contaminating ions and dried at 400° F. temperature to form a silica gel containing below about 5% water. 500 g. of the dried gel, 60 g. of $Ni_3(PO_4)_2$ and 1400 cc. of 85% $H_3PO_4$ solution were mixed in a ball mill for 30 hours. The pulverized mixture was then heated for four hours at 250° F., dried at 400° F. and granulated to form a 4–14 mesh material which was calcined at 800° F. The finished catalyst contained an equivalent of 78% $H_3PO_4$, 2% $Ni_3(PO_4)_2$ and 20% $SiO_2$ and had a free $H_3PO_4$ content of 20 wt. percent.

Catalyst B was prepared by forming a silica hydrogel from sodium silicate and $H_2SO_4$. After washing to remove ionic contaminants, 835 g. of the undried silica hydrogel (containing about 70% $H_2O$), 1163 g. of 85% $H_3PO_4$ and 14.8 g. of nickelic oxide were ball-milled for 16 hours. The material was then heated at 250° F. for four hours, dried at 400° F., pilled with 2 wt. percent graphite, employed as a pilling agent, and heated for seven hours at 320°–330° F. The material was then calcined at 800° F. The finished catalyst contained an equilavent of 78% $H_3PO_4$, 2% $Ni_3(PO_4)_2$ and 20% $SiO_2$ and had a free $H_3PO_4$ content of about 12 wt. percent. The size of the catalyst was in the range of 4 to 14 mesh.

Both catalysts were tested in fixed bed units under identical conditions in which a $C_3$ to $C_4$ feed containing about 46% olefins and about 0.3 mol percent $H_2O$ was passed through the bed at a temperature of 450° F., a pressure of 1000 p. s. i. g., a feed rate of 6.7 volumes of feed/volume of catalyst/hour (v./v./hr.). The results of the runs are shown in Table I below:

*Table I*

| Catalyst Used | A | B |
|---|---|---|
| Maximum Olefin Conversion, Percent | 93 | 98 |
| Length of Run, Hrs | 532 | 73 |
| Catalyst Age, Gal. Polymer Produced/Lb. Catalyst | 93 | 15 |
| Crushing Strength of Used Catalyst, Kg | 1.6 | 0.4 |

Catalyst B was found to have a suprisingly higher activity than catalyst A as shown by olefin conversion. However, catalyst B disintegrated rapidly in the unit, and it was necessary to discontinue the run after only 73 hours because of high catalyst losses. About 21% of the catalyst was lost from the unit during the 73 hours of operation and about 43% of the remaining used catalyst was finer than 14 mesh. Catalyst A, however, showed good mechanical strength characteristics after 532 hours, little disintegrattion occurred and catalyst losses were low. It is seen that catalysts prepared from wet silica hydrogel are unsatisfactory for fixed bed operations.

EXAMPLE II

Catalyst C was prepared similarly to catalyst A in Example I, by ball-milling dried silica gel with $H_3PO_4$ and nickel compound, and drying and calcining the composition to obtain 40–60 mesh catalyst comprising 78% $H_3PO_4$, 2% $Ni_3(PO_4)_2$ and 20% $SiO_2$.

Catalyst D was prepared similarly to catalyst B of Example I, wet silica hydrogel being milled with phosphoric acid and nickel oxide, dried and calcined to give a finished catalyst containing 78% $H_3PO_4$, 2% nickel phosphate and 20% $SiO_2$ having a size of 40 to 140 mesh.

Each catalyst was tested under substantially identical conditions by placing the finely divided catalyst in a reaction zone containing a 4 bladed fan-type stirrer and injecting a $C_4$ stream containing 43% olefins therein at a feed rate of 0.5 gallon/hr./pound of catalyst (g./hr./p.). The reaction zone was maintained at 450° F. temperature and 1000 p. s. i. g. pressure. The stirrer was operated at 300 R. P. M. to keep the catalyst slurried as a dense suspension in the hydrocarbon fluid. The feed contained about 0.1 mol percent $H_2O$ and less than about one p. p. m. fixed nitrogen.

After 89 hours operation with catalyst C, it was found that the used catalyst was badly agglomerated into lumps that were difficult to keep in suspension. Catalyst was also caked on the reactor walls. Olefin conversions of only 62 to 75% were obtained throughout the run showing the effect of agglomeration on lowering catalyst activity.

After 89 hours operation with catalyst D, it was found that no agglomeration or caking of the catalyst had occurred. Olefin conversions were maintained at from 78 to 94% during the first half of the run and dropped to 67 to 80% in the last half because of catalyst losses due to entrainment with the reactor effluent. Entrainment resulted from attrition of the catalyst into fine particles.

EXAMPLE III

Catalyst E was prepared by mulling large lumps of silica hydrogel containing about 70% water for two hours, and then adding sufficient $Ni_2O_3$ and 85% $H_3PO_4$ to give desired concentrations in the finished catalyst. The total mixture was then mixed for 17 hours, heated for four hours at 250° F. with stirring and then heated at 400° F. until dry (about 20 hours). The material was then granulated and calcined at 800° F. for one hour in the presence of nitrogen. The material was then sieved to obtain the desired size range. The finished catalyst contained an equivalent of 78% $H_3PO_4$, 2% nickel phosphate and 20% silica gel.

A $C_3$ feed containing about 55% propylene was passed into a stirred reaction zone including 100 mesh and finer catalyst E at feed rates of 0.5 and 0.25 g./hr./p., the reaction zone being maintained at 450° F. and 1000 p. s. i. g. whereby a single fluid hydrocarbon phase existed. The stirrer was operated at 300 R. P. M. such that a dense suspension of catalyst was maintained in the lower portion of the reaction zone and a dispersed hydrocarbon phase substantially free of catalyst was maintained in the upper portion. Liquid effluent was withdrawn from the dispersed phase. Olefin conversions were maintained at above 80% during 160 hours of operation, conversions being above 90% during the first 60 hours. Agglomeration of catalyst was shown to be negligible upon inspecting the catalyst at the end of the run. Entrainment of catalyst with the effluent was rather high at a feed of 0.5 g./hr./p. but not serious at the lower feed rate.

EXAMPLE IV

Catalyst F was prepared in the same way and had the same composition as catalyst E (Example III). A reaction zone was operated under the same conditions as that employed in Example III except that the top of the zone included a baffled area through which the disperse phase passed before effluent containing polymer was withdrawn. The reactor was charged with 20–100 mesh catalyst F and the stirrer was operated at 300 R. P. M. at $C_3$ feed rates as high as 1.5 g./hr./p. No entrainment of catalyst with the effluent occurred, the catalyst particles settling back into the dense phase from the baffled zone. The run was continued for 273 hours during which no agglomeration of the catalyst occurred. Some attrition of the catalyst occurred during the run. This is an interesting and beneficial property of low mechanical strength catalysts made from silica hydrogel. The catalyst undergoes attrition rather than agglomeration and continually exposes fresh, active surfaces to the reactants. This permits maintaining high olefin conversions for long periods.

EXAMPLE V

Another run was carried out using the same catalyst, reaction zone and conditions used in Example IV except the feed was $C_3$–$C_4$ (46% olefins), the pressure was 60 p. s. i. g. and the feed rate was about 0.3 g./p./hr. A constant olefin conversion of about 47 to 48% was obtained for five hours at this low pressure, after which the run was discontinued and the catalyst inspected. No agglomeration of catalyst was observed.

What is claimed is:

1. The process of polymerizing olefins in which a finely divided catalyst comprising a phosphoric acid impregnated on silica gel is maintained as a suspension in a fluid comprising said olefins under polymerization temperature and pressure conditions, said catalyst being prepared by forming an intimate mixture comprising a silica hydrogel containing from about 50 to about 90% water by weight and a phosphoric acid and heat treating the mixture to form a substantially dry, active catalyst.

2. A process in accordance with claim 1 wherein said suspension is formed by passing said olefins upwardly through said catalyst.

3. A process in accordance with claim 1 wherein said suspension is formed by mechanically agitating said olefins and catalyst.

4. Process for polymerizing normally gaseous olefins to hydrocarbons boiling in the motor fuel boiling range which comprises maintaining a finely divided catalyst comprising a phosphoric acid impregnated on silica gel as an agitated suspension in a fluid comprising said olefins at a temperature in the range of about 350° to 600° F. and a polymerization pressure, said catalyst being prepared by heat treating a mixture comprising a silica hydrogel containing from about 50 to about 90% water by weight and a phosphoric acid.

5. A process in accordance with claim 4 in which said heat treated catalyst contains in the range of 50 to 90 wt. percent phosphoric acid.

6. A process in accordance with claim 4 in which said heat treating includes drying the mixture at a temperature in the range of 350° to 450° F. and calcining the dried mixture at a temperature above 500° F.

7. A process of polymerizing normally gaseous olefins to hydrocarbons boiling in the motor fuel boiling range comprising the steps of introducing said olefins in liquid form into a reaction zone, continuously agitating the liquid olefins in contact with finely divided catalyst in said zone, said catalyst comprising a phosphoric acid impregnated on silica gel, said catalyst being prepared by heat treating a mixture comprising a silica hydrogel containing from about 50 to about 90% water by weight and a phosphoric acid, maintaining a temperature in the range of about 350°–600° F. in said zone, and withdrawing a polymerized liquid effluent from said zone.

References Cited in the file of this patent
UNITED STATES PATENTS

| | | |
|---|---|---|
| 2,525,144 | Mavity | Oct. 10, 1950 |
| 2,595,254 | Hemminger | May 6, 1952 |
| 2,656,323 | Bielawski et al. | Oct. 30, 1953 |